(12) United States Patent
Lee et al.

(10) Patent No.: US 11,322,766 B2
(45) Date of Patent: May 3, 2022

(54) DIRECT HYDROCARBON METAL SUPPORTED SOLID OXIDE FUEL CELL

(71) Applicant: Saudi Arabian Oil Company, Dhahran (SA)

(72) Inventors: Kunho Lee, Dhahran (SA); Sai P. Katikaneni, Dhahran (SA)

(73) Assignee: Saudi Arabian Oil Company

( * ) Notice: Subject to any disclaimer, the term of this patent is extended or adjusted under 35 U.S.C. 154(b) by 0 days.

(21) Appl. No.: 16/886,526

(22) Filed: May 28, 2020

(65) Prior Publication Data

US 2021/0376367 A1 Dec. 2, 2021

(51) Int. Cl.
*H01M 8/1213* (2016.01)
*H01M 4/86* (2006.01)
*H01M 4/90* (2006.01)

(52) U.S. Cl.
CPC ....... *H01M 8/1213* (2013.01); *H01M 4/8657* (2013.01); *H01M 4/8668* (2013.01); *H01M 4/9066* (2013.01)

(58) Field of Classification Search
CPC .................................................. H01M 8/1213
See application file for complete search history.

(56) References Cited

U.S. PATENT DOCUMENTS

| 4,981,676 | A | 1/1991 | Minet et al. |
| 5,229,102 | A | 7/1993 | Minet et al. |
| 5,366,712 | A | 11/1994 | Violante |
| 5,746,985 | A | 5/1998 | Takahashi |
| 5,997,594 | A | 12/1999 | Edlund et al. |
| 6,119,606 | A | 9/2000 | Clark |
| 6,153,163 | A | 11/2000 | Prasad |
| 6,180,081 | B1 | 1/2001 | Poschmann et al. |
| 6,214,485 | B1 | 4/2001 | Barnett et al. |

(Continued)

FOREIGN PATENT DOCUMENTS

| AU | 2003286894 | 6/2004 |
| AU | 2005286952 | 3/2006 |

(Continued)

OTHER PUBLICATIONS

Arora and Prasad, "An overview on dry reforming of methane: strategies to reduce carbonaceous deactivation of catalysts," RSC Adv., 6, 108668, 2016, 21 pages.

(Continued)

*Primary Examiner* — Brian R Ohara
(74) *Attorney, Agent, or Firm* — Fish & Richardson P.C.

(57) ABSTRACT

A solid oxide fuel cell including a hydrocarbon reforming catalyst and a method for forming the solid oxide fuel cell are provided. An exemplary solid oxide fuel cell includes a cell. The cell includes a filled metal substrate including holes substantially filled with a permeable material that includes a hydrocarbon reforming catalyst, wherein the filled metal substrate has a front facing a fuel flow and a back facing an electrochemical stack. A permeable layer is formed on the back of the filled metal substrate that is in contact with the permeable material of the filled holes. The cell includes an anode layer proximate to the permeable layer, an electrolyte layer proximate to the anode layer, a diffusion barrier proximate to the anode layer, and a cathode proximate to the diffusion barrier.

27 Claims, 7 Drawing Sheets

(56) References Cited

U.S. PATENT DOCUMENTS

| | | |
|---|---|---|
| 6,296,686 B1 | 10/2001 | Prasad et al. |
| 6,338,833 B1 | 1/2002 | Aasberg-Petersen |
| 6,830,596 B1 | 12/2004 | Deckman et al. |
| 6,960,235 B2 | 11/2005 | Morse et al. |
| 7,022,165 B2 | 4/2006 | Paglier et al. |
| 7,025,941 B1 | 4/2006 | Autenrieth et al. |
| 7,182,917 B2 | 2/2007 | Krueger |
| 7,217,304 B2 | 5/2007 | Deckman et al. |
| 7,323,148 B2 | 1/2008 | Shah et al. |
| 7,353,982 B2 | 4/2008 | Li |
| 7,527,661 B2 | 5/2009 | Chellappa et al. |
| 7,700,005 B2 | 4/2010 | Inui et al. |
| 7,772,450 B2 | 8/2010 | Iaccino et al. |
| 7,794,690 B2 | 9/2010 | Abatzoglou et al. |
| 7,959,897 B2 | 6/2011 | Cui et al. |
| 8,518,151 B2 | 8/2013 | Tessier et al. |
| 8,563,185 B2 | 10/2013 | Assink et al. |
| 8,597,383 B2 | 12/2013 | Pham et al. |
| 8,900,546 B2 | 12/2014 | Van De Graaf et al. |
| 9,138,718 B2 | 9/2015 | Li et al. |
| 9,493,350 B2 | 11/2016 | Morico et al. |
| 9,499,403 B2 | 11/2016 | Al-Muhaish et al. |
| 10,478,806 B2 | 11/2019 | Schuetzle et al. |
| 2002/0048699 A1* | 4/2002 | Steele ............... H01M 8/023 |
| | | 429/465 |
| 2002/0083646 A1* | 7/2002 | Deshpande ........... B01J 8/0496 |
| | | 48/197 FM |
| 2003/0041519 A1 | 3/2003 | Maruko |
| 2003/0172589 A1 | 9/2003 | Krueger |
| 2003/0175565 A1 | 9/2003 | Noda |
| 2004/0058228 A1* | 3/2004 | Shibata ............... H01M 8/0241 |
| | | 429/480 |
| 2004/0081878 A1* | 4/2004 | Mardilovich ....... H01M 8/1097 |
| | | 429/456 |
| 2004/0120889 A1 | 6/2004 | Shah et al. |
| 2004/0265483 A1* | 12/2004 | Meyer ................. H01M 8/1213 |
| | | 427/115 |
| 2005/0045034 A1 | 3/2005 | Paglier et al. |
| 2005/0109037 A1 | 5/2005 | Deckman et al. |
| 2005/0109821 A1 | 5/2005 | Li |
| 2005/0221153 A1 | 10/2005 | Sugimoto et al. |
| 2006/0013759 A1 | 1/2006 | Jiang et al. |
| 2006/0057060 A1 | 3/2006 | Sun et al. |
| 2006/0124445 A1 | 6/2006 | Labrecque et al. |
| 2007/0015015 A1 | 1/2007 | Hoshino et al. |
| 2007/0157517 A1 | 6/2007 | Tsay et al. |
| 2007/0180991 A1 | 8/2007 | Chellappa et al. |
| 2008/0090127 A1* | 4/2008 | Gorte ................. H01M 4/8621 |
| | | 429/489 |
| 2011/0076225 A1 | 3/2011 | Shah et al. |
| 2011/0177410 A1 | 7/2011 | Assink et al. |
| 2012/0121999 A1 | 5/2012 | Laurencin et al. |
| 2012/0195824 A1 | 8/2012 | Van De Graaf et al. |
| 2012/0258037 A1 | 10/2012 | Pham et al. |
| 2014/0170061 A1 | 6/2014 | Chaubey et al. |
| 2014/0350318 A1* | 11/2014 | Katikaneni ............. B01J 23/83 |
| | | 585/700 |
| 2014/0363345 A1 | 12/2014 | Li et al. |
| 2015/0037246 A1 | 2/2015 | Morico et al. |
| 2016/0214859 A1 | 6/2016 | Beltramini et al. |
| 2016/0340187 A1 | 11/2016 | Said et al. |
| 2018/0079643 A1 | 3/2018 | Mortensen et al. |

FOREIGN PATENT DOCUMENTS

| | | |
|---|---|---|
| AU | 2005287034 | 3/2006 |
| AU | 2010291148 | 3/2011 |
| AU | 2012243063 | 10/2012 |
| CA | 2458314 | 4/1999 |
| CA | 2580580 | 3/2006 |
| CA | 2580585 | 3/2006 |
| CA | 2414657 | 5/2011 |
| CA | 2547011 | 8/2011 |
| CN | 103586030 | 2/2014 |
| CN | 104098071 | 10/2014 |
| CN | 104258864 | 1/2015 |
| CN | 102482079 | 5/2016 |
| CN | 103596671 | 6/2016 |
| CN | 105197887 | 3/2017 |
| CN | 105776133 | 11/2017 |
| CN | 105561998 | 7/2018 |
| CN | 110600775 | 12/2019 |
| EP | 1024111 | 8/2000 |
| EP | 1294637 | 3/2003 |
| EP | 1789171 | 5/2007 |
| EP | 1789172 | 5/2007 |
| EP | 1828085 | 9/2007 |
| EP | 1829821 | 9/2007 |
| EP | 2035329 | 3/2009 |
| EP | 2696966 | 2/2014 |
| EP | 2825503 | 1/2015 |
| EP | 2473441 | 8/2018 |
| FR | 2943657 | 3/2009 |
| JP | H 9278403 | 10/1997 |
| JP | 2943657 | 8/1999 |
| JP | 2001348205 | 12/2001 |
| JP | 2004502623 | 1/2004 |
| JP | 2004249264 | 9/2004 |
| JP | 2004352528 | 12/2004 |
| JP | 2005044601 | 2/2005 |
| JP | 2007190455 | 8/2007 |
| JP | 2008513337 | 5/2008 |
| JP | 2008513338 | 5/2008 |
| JP | 4381033 | 10/2009 |
| JP | 2010266155 | 11/2010 |
| JP | 2011195352 | 10/2011 |
| JP | 2011195387 | 10/2011 |
| JP | 2011206612 | 10/2011 |
| JP | 2013503807 | 2/2013 |
| JP | 5390448 | 10/2013 |
| JP | 5588581 | 8/2014 |
| JP | 2014519463 | 8/2014 |
| JP | 5611627 | 9/2014 |
| JP | 2014169222 | 9/2014 |
| JP | 6040701 | 12/2016 |
| JP | 6345406 | 6/2018 |
| NO | 200701530 | 4/2007 |
| NO | 200701532 | 6/2007 |
| TW | 200619136 | 6/2006 |
| TW | 200630158 | 9/2006 |
| WO | WO 2001064577 | 9/2001 |
| WO | WO 2002002460 | 1/2002 |
| WO | WO 2002069430 | 9/2002 |
| WO | WO 2002070402 | 9/2002 |
| WO | WO 2004041714 | 5/2004 |
| WO | WO 2005051590 | 6/2005 |
| WO | WO 2006034086 | 3/2006 |
| WO | WO 2006034100 | 3/2006 |
| WO | WO 2006034103 | 3/2006 |
| WO | WO 2006082933 | 8/2006 |
| WO | WO 2006097703 | 9/2006 |
| WO | WO 2007031713 | 3/2007 |
| WO | WO 2008000782 | 1/2008 |
| WO | WO 2008003976 | 1/2008 |
| WO | WO 2010109106 | 9/2010 |
| WO | WO 2011026943 | 3/2011 |
| WO | WO 2012006429 | 1/2012 |
| WO | WO 2012142009 | 10/2012 |
| WO | WO 2012143096 | 10/2012 |
| WO | WO 2012158673 | 11/2012 |
| WO | WO 2013137720 | 9/2013 |
| WO | WO 2016069385 | 5/2016 |
| ZA | 201201141 | 10/2012 |

OTHER PUBLICATIONS

Cimino, "Deploying a solar hybrid technology in a remote oil and gas production site," Journal of the Japan Institute of Energy, 94, 1163-1168, Jan. 2015, 7 pages.

Desouza et al., "Portable Emission Measurement System (PEMS) Testing of a 100KVA Generator using Red Diesel and ISO grade

(56) References Cited

OTHER PUBLICATIONS

Diesel," King's College London, Encironmental Research Group, Dec. 2016, 12 pages.

Er-rbib et al., "Dry reforming of methane—review of feasibility studies," Chemical Engineering Transactions, vol. 29, 163-168, 2012, 7 pages.

Fakeeha et al., "Effect of changing CH4/CO2 ratio on hydrogen production by dry reforming reaction," 16th WHEC, 1, 245-256, Jun. 13-16, 2006, 12 pages.

Homerenergy.com (online), "Homer Pro," retireved from URL <https://www.homerenergy.com/products/pro/docs/latest/how_homer_creates_the_generator_efficiency_curve.html>, retrieved on Jun. 19, 2020, available on or before Jun. 11, 2020, 1 page.

Ibrahim et al., "Dry reforming of methane using Ce-modified Ni supported on 8% PO4 +ZrO2 catalysts," Catalysts 2020, 10, 242; doi: 10.3390/catal10020242, 16 pages.

Jafarbegloo et al., "One-pot synthesis of NiO—MgO nanocatalysts for CO2 reforming of methane: The influence of active metal content on catalytic performance," J Nat Gas Sci Eng 2015, 27, 1165-1173, 23 pages.

Lavoie, "Review on dry reforming of methane, a potentially more environmentally friendly approach to increasing natural gas exploitation," Frontier in Chemistry, vol. 2, Art. 81, Nov. 2014, 17 pages.

Milanov et al., "Dry Reforming of Methane with CO2 at Elevated Pressures," New Technologies and Alternative Feedstocks in Petrochemistry and Refining DGMK Conference Oct. 9-11, 2013, 5 pages.

Mogensen et al., "Methane Steam Reforming over an Ni-YSZ Solid Oxide Fuel Cell Anode in Stack Configuration," Journal of Chemistry vol. 2014, Article ID 710391, 9 pages.

Mori et al., "Reactor configuration and concentration polarization in methane steam reforming by a membrane reactor with a highly hydrogen-permeable membrane," Industrial & Engineering Chemistry Research, Feb. 2007, 46(7): 1952-1958.

Oi et al., "Simulation and cost comparison of CO2 liquefaction," Energy Procedia, 2016, 86: 500-510.

Schulz et al., "Dry Reforming of Methane at Elevated Pressures," New Technologies and Alternative Feedstocks in Petrochemistry and Refining DGMK Conference Oct. 9-11, 2013, Dresden, Germany, DGMK-Tagungsbericht 2013-2, ISBN 978-3-941721-32-6, 1 page.

Shojaeddini, "Oil and gas company strategies regarding the energy transition," Progress in Energy, 01 2001, 2019, 20 pages.

Wismann et al., "Electrified methane reforming: A compact approach to greener industrial hydrogen production," Science Magazine, May 2019, 364(6442): 756-759.

Wolfbeisser et al., "Methane dry reforming over ceria-zirconia supported Ni catalysts," Catal Today vol. 277, Part 2, Nov. 15, 2016, 12 pages.

Xu et al., "An Improved CO2 Separation and Purification System Based on Cryogenic Separation and Distillation Theoty," Energies ISSN 1996-1073, May 2014, 7: 3484-3502.

Zhang et al., "Coke-resistant Ni@SiO2 catalyst for dry reforming of methane," Appl Catal B—Environ 2015, 176, 513-521, 9 pages.

PCT International Search Report and Written Opinion in International Appln. No. PCT/US2021/034138, dated Sep. 16, 2021, 15 pages.

Hibino et al., "Ru-catalyzed anode materials for direct hydrocarbon SOFCs," Electrochimica ACTA, Jul. 2003, 48(17): 2531-2537, 7 pages.

* cited by examiner

DIRECT HYDROCARBON METAL SUPPORTED SOLID OXIDE FUEL CELL

TECHNICAL FIELD

This disclosure relates to solid oxide fuel cells.

BACKGROUND

Fuel cells have emerged as promising candidates for the generation of energy, because they provide low emissions during operation and supply energy without depending on changes in the external environment, such as wind or insolation. A fuel cell is the energy conversion device that enables the direct conversion of chemical energy, generally provided by a hydrogen fuel stream, into electrical energy. A fuel cell can be operated without noise, vibration, or polluting gas emissions. Hydrocarbons have been considered to be one of the potential fuels for fuel cells as they have a high energy density. However, hydrocarbons are difficult sources to utilize in fuel cells without catalysts and higher temperatures.

SUMMARY

An embodiment described herein provides a solid oxide fuel cell (SOFC), including a cell. The cell includes a filled metal substrate including holes substantially filled with a permeable material that includes a hydrocarbon reforming catalyst, wherein the filled metal substrate has a front facing a fuel flow, and a back facing an electrochemical stack. A permeable layer is formed on the back of the filled metal substrate that is in contact with the permeable material of the filled holes. The cell includes an anode layer proximate to the permeable layer, an electrolyte layer proximate to the anode layer, a diffusion barrier proximate to the anode layer; and a cathode proximate to the diffusion barrier.

Another embodiment described herein provides a method of making a solid oxide fuel cell (SOFC). The method includes fabricating a cell by obtaining a metal substrate including holes in a center region, filling the holes with a catalyst paste to form a filled metal substrate, and coating a back of the filled metal substrate with a permeable layer, wherein a front of the filled metal substrate is configured to face a fuel flow and a back of the filled metal substrate is configure to face an anode layer. The filled metal substrate is fired with the permeable layer coated over the back to form a ceramic structure. The permeable layer is coated with an anode layer and the ceramic structure is fired to fix the anode layer. The anode layer is coated with an electrolyte layer and the ceramic structure is fired to fix the electrolyte layer. The electrolyte layer is coated with a buffer layer and a cathode layer is formed over the electrolyte layer. The ceramic structure is fired to fix the buffer layer and the cathode layer.

DETAILED DESCRIPTION

Solid oxide fuel cells (SOFCs) that can utilize the hydrocarbon as a fuel are being tested. A typical SOFC is operated at higher temperatures (700-800° C.) than other types of fuel cells, such as alkaline fuel cell or proton exchange membrane fuel cell, which operate at less than about 90° C. The high operating temperature provides some advantages over other types of fuel cells, such as inherent reforming properties and resistance to CO poisoning, which may enable utilization of low carbon number hydrocarbons as fuel. However, technical limitations often limit the carbon number of the fuel, for example, generally preventing the use of liquid propane gas or heavy naphtha.

The conventional anode material is nickel used in SOFCs. Nickel provides good electrochemical properties, but it has a high susceptibility to forming carbon deposits. Directly operating a SOFC using high hydrocarbon means the nickel anode is exposed under rich carbon conditions, which can lead to carbon deposition on the anode and mechanical fracture of cells. A number of advanced hydrocarbon reforming catalysts have been developed. A new solid oxide fuel cell is disclosed herein which embeds a hydrocarbon reforming catalyst in holes formed in a metal support of the SOFC. Accordingly, higher carbon number materials contact the hydrocarbon reforming catalysts prior to contacting the anode or other layers in the SOFC. This decreases the probability of formation of carbon deposits, allowing the use of higher carbon number fuels. Further, in addition to electricity, the SOFC produces heat and a reformate exhaust stream that includes hydrogen, carbon monoxide, carbon dioxide, and water. The heat and the reformate exhaust stream may be used to integrate the SOFC into other processes, such as refineries.

Figure 1:
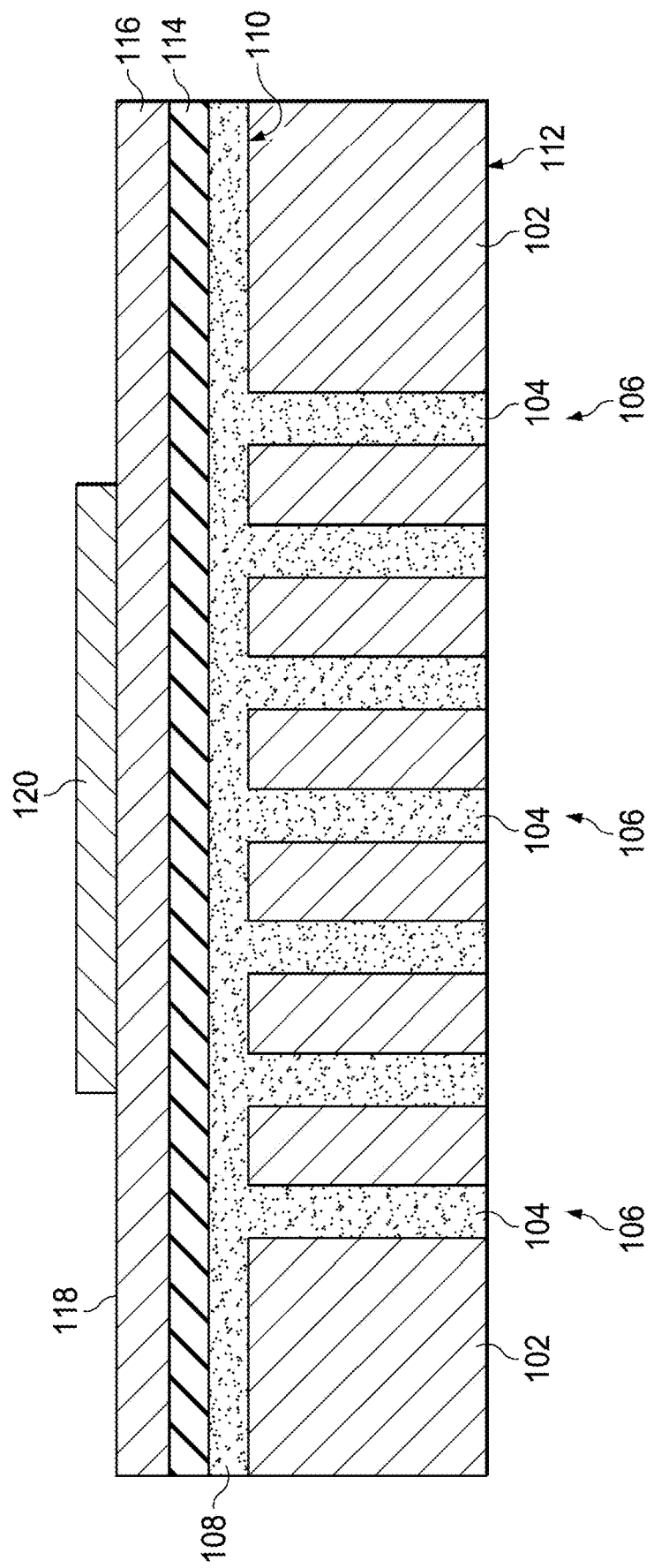
FIG. 1 is a cross-sectional view of a cell of a solid oxide fuel cell showing a metal substrate with a hydrocarbon reforming catalyst filling holes in the metal substrate.

FIG. 1 is a cross-sectional view of a cell of a solid oxide fuel cell showing a metal substrate 102 with a hydrocarbon reforming catalyst 104 filling holes 106 in the metal substrate 102. The metal substrate 102, which provides the mechanical support for the cell 100, is made from low-cost and robust metals, such as stainless steel and corrosion resistant stainless steel, among others. It can be noted that, for clarity, not every hole is labeled. In various embodiments, the metal substrate 102 is between about 100 µm and about 500 µm in thickness, or between about 150 µm and about 300 µm in thickness, or about 200 µm in thickness. The selection of the thickness of the metal substrate 102 is based on a balance of physical properties with diffusion rates of hydrocarbon fuels through the reforming catalyst. A thinner metal substrate 102 may have higher diffusion rates but may be more fragile than a thicker metal substrate 102. In various embodiments, the holes are about 100 µm to about 500 µm in diameter, or about 150 µm to about 350 µm in diameter, or about 200 µm (0.2 mm) in diameter.

In addition to the reforming catalyst 104 filling the holes 106 of the metal substrate 102, a layer 108 of a permeable material, such as the reforming catalyst 104 or an interconnect coating material, is coated over the back 110 of the metal substrate 102. As used herein, the front 112 of the metal substrate 102 will be in contact with the hydrocarbon fuel during operation. In various embodiments, the layer 108 of the permeable material will be between about 20 µm and about 100 µm in thickness, or between about 30 µm and about 70 µm in thickness, or about 40 µm in thickness. In some embodiments, the interconnect coating material is layered over the front 112 of the metal substrate 102. The interconnect coating material may provide protection to the surface of the metal substrate 102. If present, the interconnect coating material will be between about 20 µm and about 100 µm in thickness, or between about 30 µm and about 70 µm in thickness, or about 40 µm in thickness.

The layer 108 of reforming catalyst 104 on the back of the metal substrate 102 is covered with an anode layer 114 that has been infiltrated with the reforming catalyst 104. In various embodiments the anode layer 114 is between about 20 µm and about 90 µm in thickness, or between about 30 µm and about 70 µm in thickness, or about 40 µm in thickness. An electrolyte layer 116 is deposited over the anode layer 114. In various embodiments, the electrolyte layer 116 is between about 1 µm and 5 µm in thickness, or between about 1.5 µm and about 3 µm in thickness, or about 2 µm in thickness. A buffer layer 118, or diffusion barrier, is coated over the electrolyte layer 116 and a cathode layer 120 is then deposited over the buffer layer 118. The buffer layer 118 acts as a barrier layer to prevent diffusion of the reaction between the cathode layer 120 and the electrolyte layer 116. In some embodiments, the buffer layer 118 includes gadolinium doped ceria (CGO). In other embodiments, the buffer layer 118 includes samarium doped ceria (SDC), Lanthanum doped ceria (LDC), La0.3Sr0.7TiO3 (LST), $Y_{0.3}Sr_{0.7}TiO_3$ (YST), alone or in any combinations. In various embodiments, the buffer layer 118 is between about 50 nm and 1 µm in thickness, or between about 100 nm and about 500 nm in thickness, or about 350 nm in thickness.

The ceramic layers, such as the layer 108 of the reforming catalyst 104, the anode layer 114, and the electrolyte layer 116, are only as thick as is required to ensure electrochemical function. This reduces the catalyst amounts and, thus, the material costs for the cell. The electrochemically active layers 108, 114, and 116 are applied directly to the metal substrate 102 of the cell 100. Accordingly, the metal-supported SOFC formed from a stack of the cells 100 is cost effective and easily manufactured. Furthermore, the metal-supported SOFCs have high robustness, allowing their use in mobile or portable applications.

Figure 2:
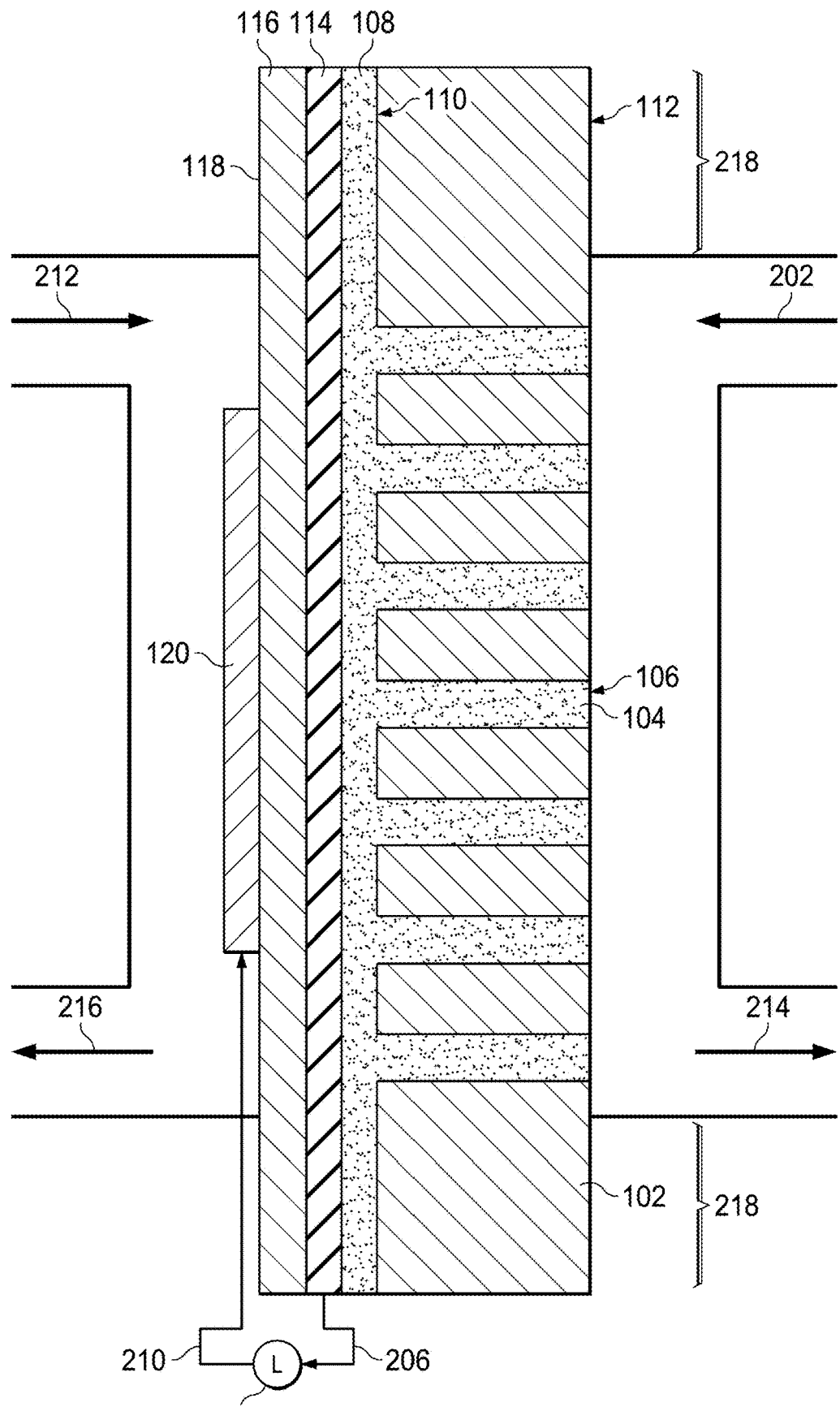
FIG. 2 is a schematic drawing of the use of the cell in generating electricity while reforming a hydrocarbon fuel.

FIG. 2 is a schematic drawing of the use of the cell 100 in generating electricity while reforming a hydrocarbon fuel 202. Like numbered items are as described with respect to FIG. 1. As described herein, the hydrocarbon fuel 202 may include higher carbon number materials, for example, C3s, C4s, C5s, and higher carbon number materials. In various embodiments, the hydrocarbon fuel 202 includes light naphtha, liquid propane gas, gasoline, and the like. The hydrocarbon fuel 202 diffuses through the reforming catalyst 104 in the holes 106 of the metal substrate 102. As a result of the contact with reforming catalyst 104, the hydrocarbon fuel 202 is reformed to various products, including hydrogen, carbon monoxide, and the like. In the electrochemical reaction in the cell 100, the hydrogen loses electrons 206 to the anode layer 114, which are conducted to a load 208.

After powering the load 208, the electrons 210 are returned to the cathode layer 120. At the cathode layer 120, the electrons 210 react with oxygen in an oxidizer flow 212 forming oxide ions. The oxide ions are carried across the electrolyte layer 116 to the anode layer 114, where they react with the hydride ions to form water. The water may be partially consumed in the reforming catalyst 104 in reactions with the hydrocarbon fuel 202 to form additional hydrogen.

As described herein, in addition to producing electrical power, the metal-supported SOFCs produce an exhaust stream 214 that includes steam, heat, hydrogen, carbon dioxide, and carbon monoxide. The exhaust stream 214 can be processed to form additional hydrogen using a water gas shift reaction, increasing the amount of hydrogen produced. This increases the total efficiency of the process and lowers hydrogen production costs compared to conventional steam reforming processes. In some embodiments, the hydrogen is blended with the hydrocarbon fuel 202 to further increase the efficiency of the process. A portion of the oxidizer flow 212 exits the SOFC as unused gas 216

In some embodiments, an outer portion or ring 218 around the cell is left open. This may be used for mounting purposes, and is described with respect to the design of the metal substrate 102 in FIGS. 3A, 3B, and 4.

Figure 3A:
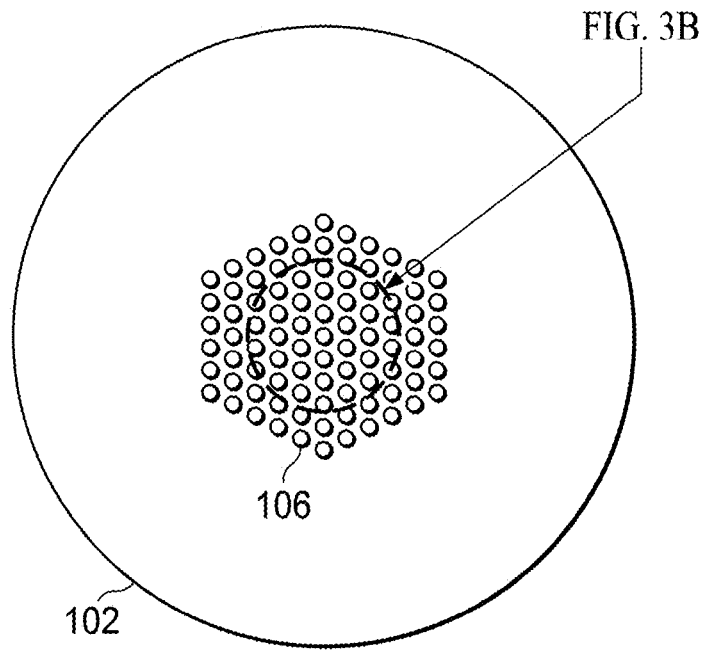
FIG. 3A is a drawing of the metal substrate showing the holes in the center.

FIG. 3A is a drawing of the metal substrate 102 showing the holes 106 in the center. Like numbered items are as described with respect to FIG. 1. The metal substrate 102 is prepared with the holes 106 using a chemical etching process. In the etching process, a protective mask is deposited over the metal substrate 102. The protective mask may be removed over the area in which each hole 106 will be etched using a laser, electron-beam, or other radiative technique to degrade the protective mask over each hole 106. A solvent may then be used to remove the protective mask over each hole 106. Once the solvent has removed the protective mask over each hole 106 an acid etching process may be used to create the holes through the metal substrate 102. It may be understood, that any number of other techniques may be used to create the holes 106, including plasma etching, laser drilling, micro drilling, and the like.

Figure 3B:
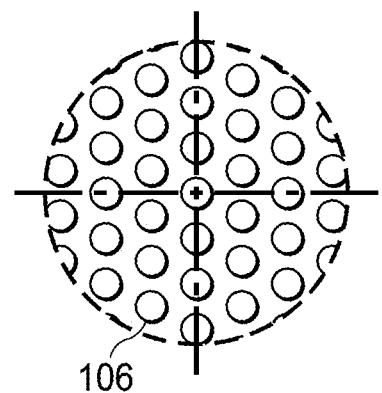
FIG. 3B is a close-up drawing of the pattern of the holes in the metal substrate.

FIG. 3B is a close-up drawing of the pattern of the holes 106 in the metal substrate 102. The use of the chemical etching techniques allows the holes 106 to be formed in much smaller dimensions than possible with physical techniques, such as drilling the holes. For example, in some embodiments, the holes 106 are about 200 µm in diameter, as described with respect to FIG. 1. Further, the chemical etching makes the formation of a large number of holes 106 much more efficient than techniques that create the holes 106 individually.

Figure 4:
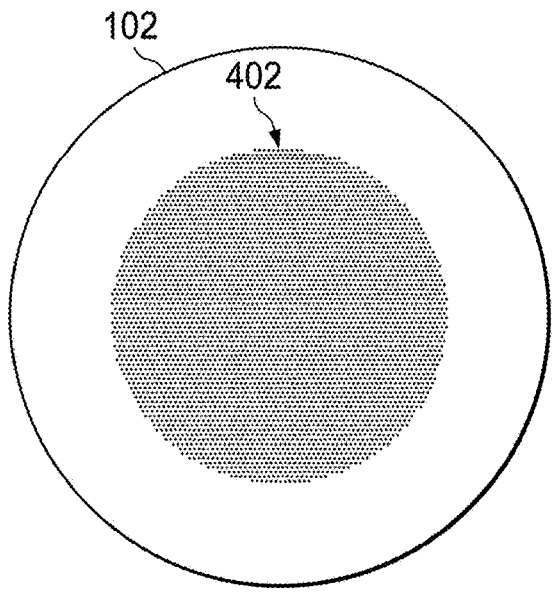
FIG. 4 is a drawing of the metal substrate showing the region in which the holes are located.

FIG. 4 is a drawing of the metal substrate 102 showing the region 402 in which the holes are located. As described with respect to FIG. 3, the holes 106 (FIG. 1) may be in the 200 µm size range. The metal substrate 102 may be fabricated in a variety of sizes depending on the target size and application of the final SOFC. In some embodiments, the metal substrate 102 may be between about 10 mm and about 40 mm in diameter, or about 15 mm and about 35 mm in diameter, or about 25 mm in diameter. In some embodiments, the metal substrate 102 may be between about 30 mm and about 70 mm in diameter, or about 40 mm to about 60 mm in diameter, or about 50 mm in diameter. Larger or smaller diameters for the metal substrate 102 may be used for specific applications. For example, a fixed installation SOFC used as an auxiliary power unit and hydrogen generator in a refinery may include a metal substrate 102 having a diameter of about 100 mm (10 cm), or larger. Similarly, a mobile SOFC used as a portable power supply and heating unit for a mobile operation may include a metal substrate 102 having a diameter of about 10 mm (1 cm), or smaller.

Figure 5:
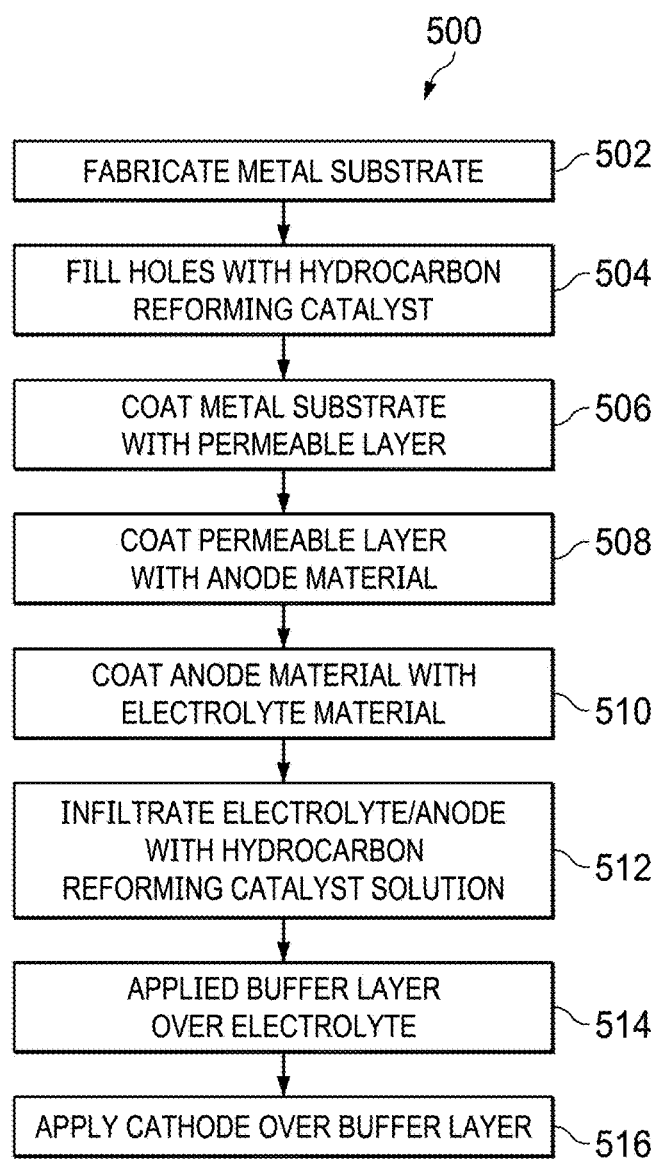
FIG. 5 is a process flow diagram of a method for forming a cell for a solid oxide fuel cell.

FIG. 5 is a process flow diagram of a method 500 for forming a cell 100 (FIG. 1) for a solid oxide fuel cell. The method begins at block 502, with the fabrication of the metal substrate. This may be performed by machining a blank disc of a target size, as described with respect to FIG. 4. The holes are then formed in the disc in a center region, leaving a surrounding region open for mounting after the final assembly is formed, for example, as described with respect to FIG. 2. The formation of the holes may be performed by chemical etching, or other techniques, as described with respect to FIG. 3A. Before further operations, the metal substrates are cleaned, for example, in an ultrasonic bath containing ethanol.

At block 504, the holes in the metal substrate are filled with the hydrocarbon reforming catalyst, forming a filled metal substrate. In various embodiments, the hydrocarbon reforming catalyst is Ni—Ru/CGO (cerium gadolinium oxide impregnated with nickel and ruthenium), Ni/CGO, Ru/CGO, or a thermal-neutral reforming (TNR) catalyst (for example, a Ni—$Ce_2O_3$—Pt—Rh catalyst), among others. The hydrocarbon reforming catalyst is pre-coarsened at about 950° C. and made into a slurry an inorganic binder solution, such as Cerabind 644-A, which is an acidic alumina binder from Aremco Products Inc., of Valley Cottage, N.Y., USA. The slurry is coated over the metal substrate using a doctor blade to form a uniform coating and push the slurry into the holes.

At block 506, a permeable layer is formed over the back side of the filled metal substrate. In some embodiments, the permeable layer is a layer of the hydrocarbon reforming catalyst. In other embodiment, the layer of the hydrocarbon reforming catalyst is not formed, and the permeable layer is an interconnect coating material, which is formed over both sides of the filled metal substrate instead. In various embodiments, the interconnect coating material is a paste formed from $Y_{0.2}Sr_{0.8}TiO_3$, $La_{0.3}Sr_{0.7}TiO_3$ (LST), or $MnCo_3O_4$ or any combinations thereof. The paste is coated over both sides of the filled metal substrate, then vacuum dried at about 80° C. for about 30 min.

After the hydrocarbon reforming catalyst or interconnect coating material is dried, the filled metal substrate is fired at about 950° C. for about an hour under air. In embodiments in which a layer of hydrocarbon reforming catalyst is used, after firing, the interconnect coating material may be applied to both sides, dried and fired. Any number of other combinations may be used, such as forming a layer of hydrocarbon reforming catalyst on the backside of the filled metal substrate and a layer of the interconnect coating material on the front side of the filled metal substrate, before drying and firing. The firing forms a ceramic structure from the layers of material, which is then further processed to form additional layers.

At block 508, the hydrocarbon reforming catalyst, or interconnect coating material, anode scaffolding material is supplied to the backside of the filled metal substrate. In an embodiment, a paste of LST ($La_{0.3}Sr_{0.7}TiO_3$),CGO (gadolinium doped ceria), or both, is applied by a doctor blade to the back side of the filled metal substrate, over either the layer of hydrocarbon reforming catalyst or the interconnect coating material. In various embodiments, a perovskite compound is used instead of, or in addition to, the LST, CGO, or both. The paste is vacuum dried at about 80° C. for about 30 min., prior to firing at about 950° C. for about an hour under air.

At block 510, an electrolyte is coated over the fired anode material. This may be performed by a sol-gel spin coating process. The multiple sol-gel coating process is carried out by using three different solutions. First, a high-viscosity CGO solution is deposited on the porous anode. After that, in order to densify the electrolyte layer, two low-viscosity YSZ solutions are coated in order of a solution containing nanoparticles and a solution without nanoparticles. The electrolyte coating is then treated at about 950° C. for about an hour under air. In various embodiments, the electrolyte is a mixture of CGO and yttria-stabilized zirconia (YSZ).

At block 512, the structure is infiltrated with a solution of hydrocarbon reforming catalyst. In an embodiment, this is performed multiple times, with the material allowed to dry between each application. The hydrocarbon reforming catalyst solution may be an aqueous solution of nickel at about 8 wt. %.

At block 514, a buffer layer is supplied over the electrolyte layer. The buffer layer prevents the diffusion of reactants between the electrolyte and a subsequently applied cathode material. In an embodiment, the buffer layer is CGO. In other embodiments, YDC, SDC, LST, YST, or combinations thereof, are used in place of, or in addition to, the CGO At block 516, a cathode is applied to the surface of the buffer layer. In various embodiments, this is performed by screen printing the cathode over the buffer layer. The cathode and buffer layer are then fired at about 900° C., for about an hour in air. In some embodiments, the cathode is a blend of LSCF (lanthanum strontium cobalt ferrite) with CGO, in any ratio from 0 to 100%. In some embodiments, the cathode includes other materials, such as LSM (lanthanum strontium manganite), LSM/YSZ, SDC (samaria-doped ceria), or BSCF ($Ba_{0.5}Sr_{0.5}Co_{0.8}Fe_{0.2}O_3$). These materials may be used in any combinations or in multilayer structures.

After the cell structure is formed, it may be assembled into a multi-cell solid oxide fuel cell, forming the final structure. In the final structure, the cathodes and anodes are wired together in groups of serial and parallel connections to achieve a target voltage and target amperage.

EXAMPLES

Using the general procedure above, a cell for a solid oxide fuel cell was formed and tested. In the particular example tested, the holes in the metal substrate were filled with CGO in place of the reforming catalyst paste. Further, the interconnect coating material was used as a metal protection layer instead of the layer of hydrocarbon reforming catalyst over the backside of the filled metal substrate. The composition is shown in Table 1, along with the particular fabrication method and heat treatment used.

TABLE 1

| | | Specific structure tested | | |
|---|---|---|---|---|
| Step no. | Functional Component | Material | Fabrication method | Heat-treatment temperature/time |
| 1 | Substrate | Crofer ® 22 APU (0.2 mm thickness)[1] | Chemical etching of 0.2 mm holes | n/a |

TABLE 1-continued

Specific structure tested

| Step no. | Functional Component | Material | Fabrication method | Heat-treatment temperature/time |
|---|---|---|---|---|
| 2 | Filling material | Pre-coarsened CGO | Cerabind 644A[2] | n/a |
| 3 | Metal protection layer[3] | $Y_{0.2}Sr_{0.8}TIO_3$ | Doctor blade coating | 1000° C., 1 hr. |
| 4 | Anode | LST/GDC | Doctor blade coating | 1000° C., 1 hr. |
| 5 | Electrolyte | GDC/YSZ | Multi-coating process | 950° C., 2 hr. |
| 6 | Catalyst | Ni | 5 repetitions of infiltration (8 wt % in ethanol) | 900° C., 1 hr. |
| 7 | Buffer layer | GDC | Spin solution coating | |
| 8 | Cathode | LSCF/GDC | Screen printing | |

Figure 6:
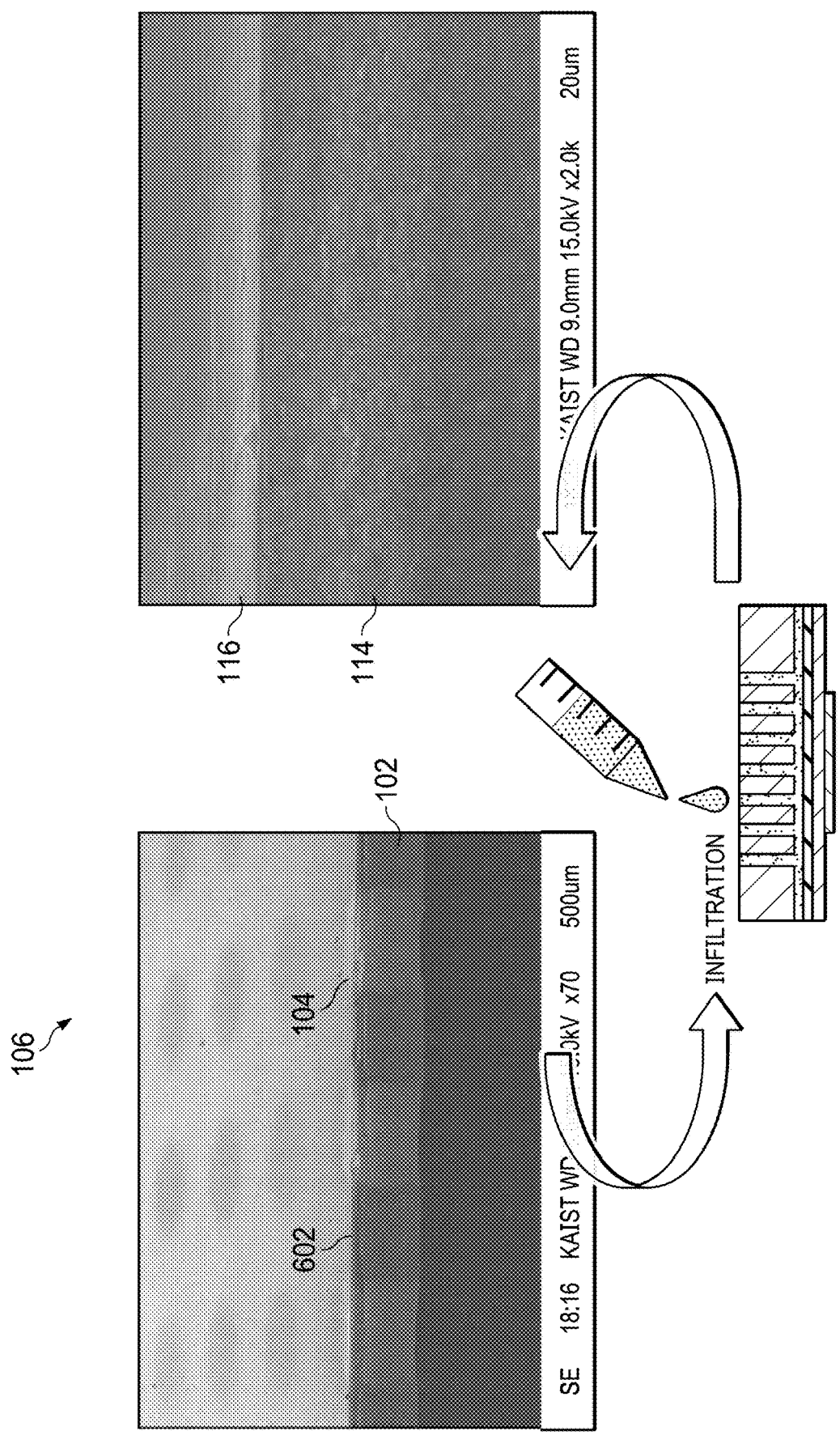
FIG. 6 is a schematic drawing showing the results of the infiltration described with respect to step 6 of Table 1.

[1]Available from ThyssenKrupp VDM Gmbh
[2]Available from Aremco Products, Inc.
[3]Used in place of hydrocarbon reforming catalyst, and applied to both sides of substrate FIG. 6 is a schematic drawing showing a cross section of a similar cell with the infiltration of the catalyst solution described with respect to step 6 of Table 1. Like numbered items are as described with respect to FIG. 1. The infiltration of the catalyst solution may be performed by applying the solution to the back of the structure after the electrolyte is applied and fired. The solution is allowed to absorb into the structure through the permeable layers. This is repeated for about five times. The metal protection layer 602 or interconnect material can be seen in FIG. 6.

Figure 7:
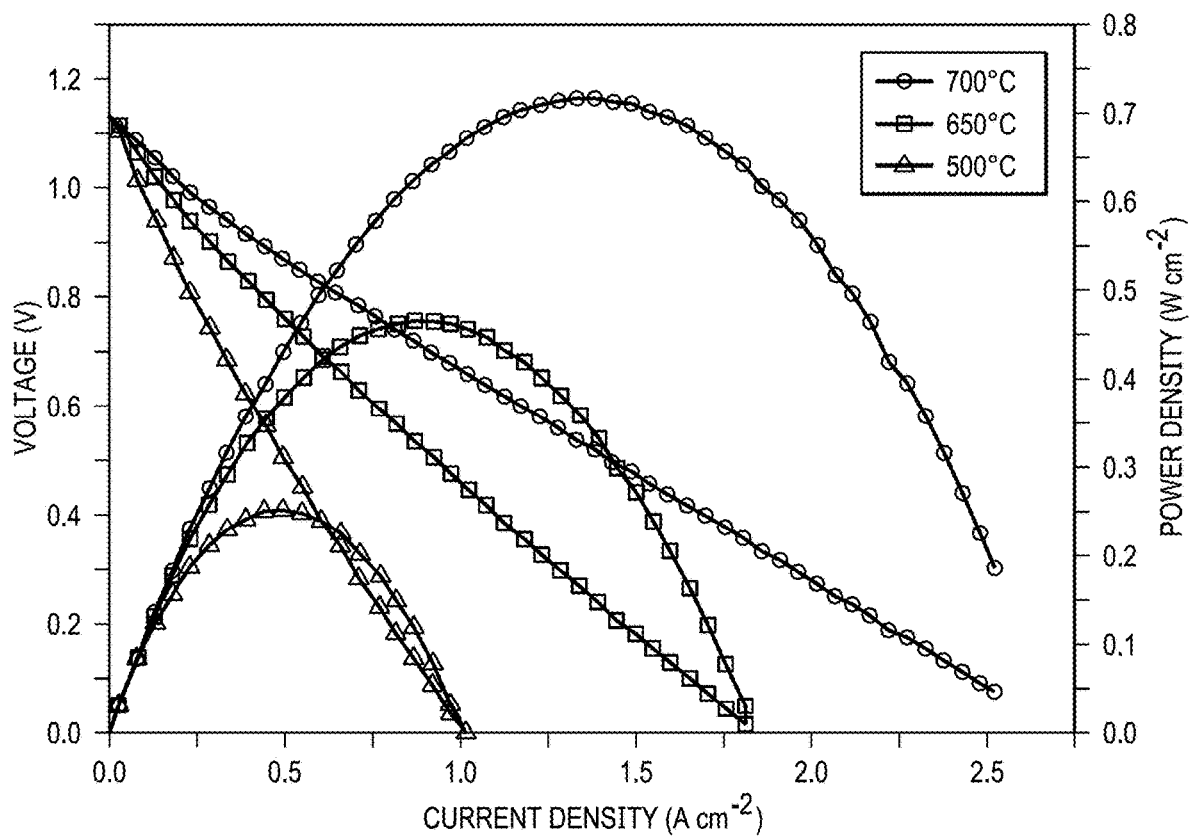
FIG. 7 is a plot of the power density and voltage of the solid oxide fuel cell plotted against the current density.

FIG. 7 is a plot of the power density and voltage of the metal supported solid oxide fuel cell plotted against the current density. In this test, the performance of the fabricated metal-supported SOFC was tested using a fuel flow that included 97% hydrogen and 3% water. In this example, the SOFC used a convention nickel catalyst impregnated in the holes of the metal substrate.

Figure 8:
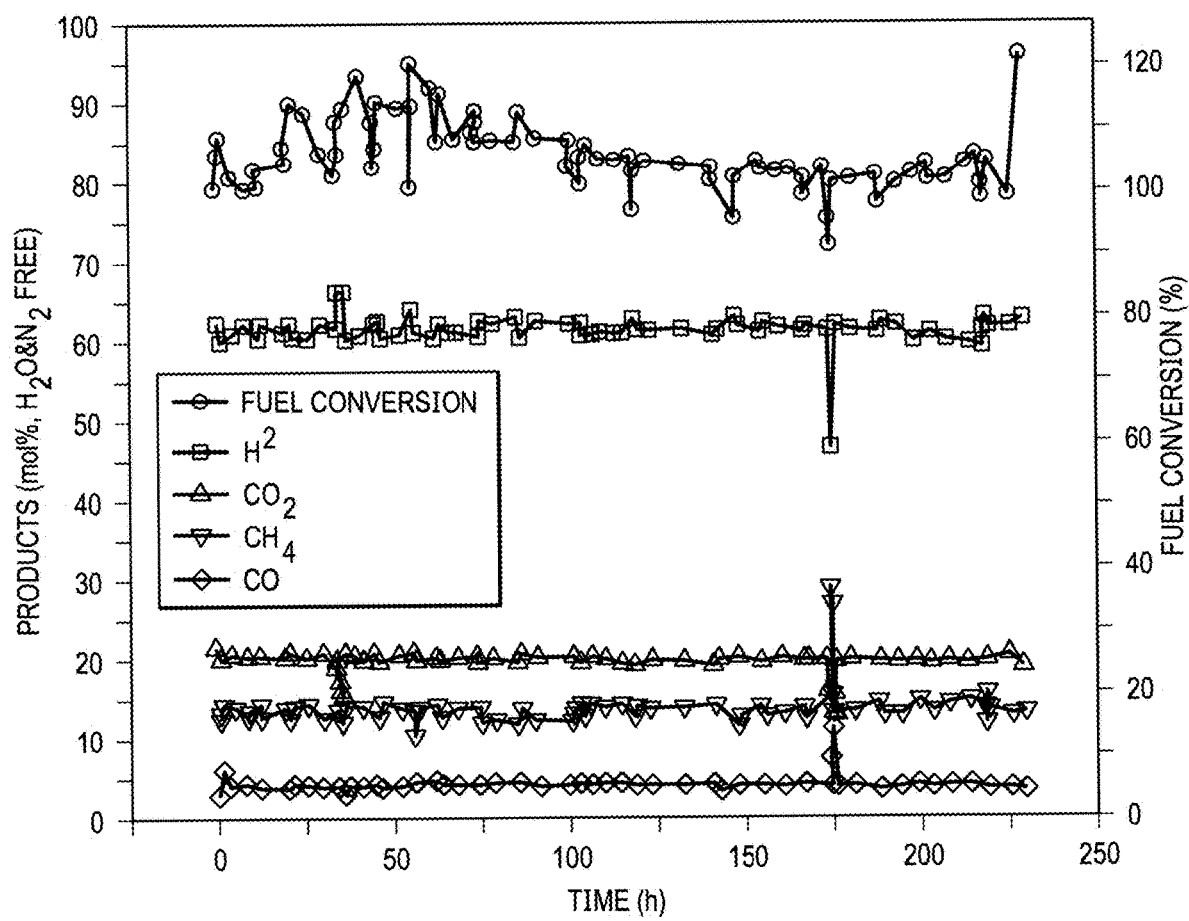
FIG. 8 is a plot of the long-term stability of a Ni—Ru/CGO reforming catalyst using an n-dodecane feed as fuel.

FIG. 8 is a plot of the long-term stability of a Ni—Ru/CGO reforming catalyst using an n-dodecane feed as fuel. In this test, the catalyst included a catalyst blend of 19.5 wt. % of Ni and 0.5 wt. % Ni—Ru/CGO. The fuel flow included n-dodecane and $H_2O$ with a molar ratio of $H_2O/C$ of 3.0.

As can be seen in FIG. 8, the fuel conversion remained substantially consistent over a 225 hour period. The products of the reforming were hydrogen, carbon dioxide, methane, and carbon monoxide. The test shows the suitability of the catalyst for use in the solid oxide fuel cell described herein.

An embodiment described herein provides a solid oxide fuel cell (SOFC), including a cell. The cell includes a filled metal substrate including holes substantially filled with a permeable material that includes a hydrocarbon reforming catalyst, wherein the filled metal substrate has a front facing a fuel flow and a back facing an electrochemical stack. A permeable layer is formed on the back of the filled metal substrate that is in contact with the permeable material of the filled holes. The cell includes an anode layer proximate to the permeable layer, an electrolyte layer proximate to the anode layer, a diffusion barrier proximate to the anode layer, and a cathode proximate to the diffusion barrier.

In an aspect, the filled metal substrate is between about 150 μm and about 300 μm in thickness. In an aspect, the filled metal substrate is about 200 μm in thickness.

In an aspect, the permeable layer is between about 30 μm and about 70 μm in thickness. In an aspect, the permeable layer is about 40 μm in thickness.

In an aspect, the anode layer is between about 30 μm and about 70 μm in thickness. In an aspect, the anode layer is about 40 μm in thickness.

In an aspect, the electrolyte layer is between about 1.5 μm and 3 μm in thickness. In an aspect, the electrolyte layer is about 2 μm in thickness.

In an aspect, the diffusion barrier is between about 100 nm and about 500 nm in thickness. In an aspect, the diffusion barrier is about 350 nm in thickness.

In an aspect, the permeable material includes an inorganic binder.

In an aspect, the hydrocarbon reforming catalyst includes nickel, Ni—Ru/CGO (gadolinium doped ceria), Ni/CGO, Ru/CGO, or Ni—$Ce_2O_3$—Pt—Rh, or any combinations thereof. In an aspect, the hydrocarbon reforming catalyst includes Ni—Ru/CGO.

In an aspect, the permeable layer includes the hydrocarbon reforming catalyst.

In an aspect, the permeable layer includes an interconnect coating material. In an aspect, the interconnect coating material includes $Y_{0.2}Sr_{0.8}TiO_3$, $La_{0.3}Sr_{0.7}TiO_3$, or $MnCo_3O_4$, or any combinations thereof. In an aspect, an interconnect coating material is coated on the front of the filled metal substrate.

In an aspect, the anode layer includes LST ($La_{0.3}Sr_{0.7}TiO_3$) and CGO (gadolinium doped ceria). In an aspect, the electrolyte layer includes a mixture of CGO and yttria-stabilized zirconia (YSZ). In an aspect, the diffusion barrier includes CGO. In an aspect, the cathode includes a blend of LSCF (lanthanum strontium cobalt ferrite) and CGO.

Another embodiment described herein provides a method of making a solid oxide fuel cell (SOFC). The method includes fabricating a cell by obtaining a metal substrate including holes in a center region, filling the holes with a catalyst paste to form a filled metal substrate, and coating a back of the filled metal substrate with a permeable layer, wherein a front of the filled metal substrate is configured to face a fuel flow and a back of the filled metal substrate is configure to face an anode layer. The filled metal substrate is fired with the permeable layer coated over the back to form a ceramic structure. The permeable layer is coated with an anode layer and the ceramic structure is fired to fix the anode layer. The anode layer is coated with an electrolyte layer and the ceramic structure is fired to fix the electrolyte layer. The electrolyte layer is coated with a buffer layer and a cathode layer is formed over the electrolyte layer. The ceramic structure is fired to fix the buffer layer and the cathode layer.

In an aspect, obtaining the metal substrate includes chemical etching holes in the center region of the metal substrate. In an aspect, filling the holes with the catalyst paste includes dragging an excess of the catalyst paste across a surface of the metal substrate with a doctor blade. In an aspect, coating the back of the filled metal substrate with the permeable layer includes applying a layer of the catalyst paste to the back of the filled metal substrate.

In an aspect, coating the back of the filled metal substrate with the permeable layer includes applying a layer of an interconnect coating material into the back of the filled metal substrate.

In an aspect, the method includes applying the interconnect coating material to both the back and the front of the filled metal substrate.

In an aspect, firing the ceramic structure includes heating the ceramic structure to greater than 900° C. for about one hour in air.

In an aspect, the method includes infiltrating the electrolyte layer and anode layer with a solution of a hydrocarbon reforming catalyst. In an aspect, the method includes repeating the infiltration of the electrolyte layer and anode layer with the solution of the hydrocarbon reforming catalyst for about five repetitions on each of the front and the back of the filled metal substrate. In an aspect, forming the cathode layer includes screenprinting a cathode material over the electrolyte layer.

Other implementations are also within the scope of the following claims.

What is claimed is:

1. A solid oxide fuel cell (SOFC), comprising a cell comprising:
    a filled metal substrate comprising holes substantially filled with a permeable material that comprises a hydrocarbon reforming catalyst, wherein the filled metal substrate has a front facing a fuel flow, and a back facing an electrochemical stack;
    a permeable layer formed on the back of the filled metal substrate that is in contact with the permeable material of the filled holes, wherein the permeable material comprises an inorganic binder;
    an anode layer proximate to the permeable layer;
    an electrolyte layer proximate to the anode layer;
    a diffusion barrier proximate to the anode layer; and
    a cathode proximate to the diffusion barrier.

2. The SOFC of claim 1, wherein the filled metal substrate is between about 150 μm and about 300 μm in thickness.

3. The SOFC of claim 1, wherein the filled metal substrate is about 200 μm in thickness.

4. The SOFC of claim 1, wherein the permeable layer is between about 30 μm and about 70 μm in thickness.

5. The SOFC of claim 1, wherein the permeable layer is about 40 μm in thickness.

6. The SOFC of claim 1, wherein the anode layer is between about 30 μm and about 70 μm in thickness.

7. The SOFC of claim 1, wherein the anode layer is about 40 μm in thickness.

8. The SOFC of claim 1, wherein the electrolyte layer is between about 1.5 μm and 3 μm in thickness.

9. The SOFC of claim 1, wherein the electrolyte layer is about 2 μm in thickness.

10. The SOFC of claim 1, wherein the diffusion barrier is between about 100 nm and about 500 nm in thickness.

11. The SOFC of claim 1, where the diffusion barrier is about 350 nm in thickness.

12. The SOFC of claim 1, wherein the hydrocarbon reforming catalyst comprises nickel, Ni—Ru/CGO (gadolinium doped ceria), Ni/CGO, Ru/CGO, or Ni—$Ce_2O_3$—Pt—Rh, or any combinations thereof.

13. The SOFC of claim 1, wherein the hydrocarbon reforming catalyst comprises Ni—Ru/CGO.

14. The SOFC of claim 1, wherein the permeable layer comprises the hydrocarbon reforming catalyst.

15. The SOFC of claim 1, wherein the permeable layer comprises an interconnect coating material.

16. The SOFC of claim 15, where the interconnect coating material comprises $Y_{0.2}Sr_{0.8}TiO_3$, $La_{0.3}Sr_{0.7}TiO_3$, or $MnCo_3O_4$, or any combinations thereof.

17. The SOFC of claim 1, wherein an interconnect coating material is coated on the front of the filled metal substrate.

18. The SOFC of claim 1, wherein the anode layer comprises LST ($La_{0.3}Sr_{0.7}TiO_3$) and CGO (gadolinium doped ceria).

19. The SOFC of claim 1, wherein the electrolyte layer comprises a mixture of CGO and yttria-stabilized zirconia (YSZ).

20. The SOFC of claim 1, wherein the diffusion barrier comprises CGO.

21. The SOFC of claim 1, wherein the cathode comprises a blend of LSCF (lanthanum strontium cobalt ferrite) and CGO.

22. A solid oxide fuel cell (SOFC), comprising a cell comprising:
    a filled metal substrate comprising holes substantially filled with a permeable material that comprises a hydrocarbon reforming catalyst, wherein the filled metal substrate has a front facing a fuel flow, and a back facing an electrochemical stack;
    a permeable layer formed on the back of the filled metal substrate that is in contact with the permeable material of the filled holes, wherein the permeable layer comprises an interconnect coating material, and where the interconnect coating material comprises $Y_{0.2}Sr_{0.8}TiO_3$, $La_{0.3}Sr_{0.7}TiO_3$, or $MnCo_3O_4$, or any combinations thereof;
    an anode layer proximate to the permeable layer;
    an electrolyte layer proximate to the anode layer;
    a diffusion barrier proximate to the anode layer; and
    a cathode proximate to the diffusion barrier.

23. The SOFC of claim 22, wherein the hydrocarbon reforming catalyst comprises Ni—Ru/CGO.

24. The SOFC of claim 22, wherein the permeable layer comprises the hydrocarbon reforming catalyst.

25. A solid oxide fuel cell (SOFC), comprising a cell comprising:
    a filled metal substrate comprising holes substantially filled with a permeable material that comprises a hydrocarbon reforming catalyst, wherein the filled metal substrate has a front facing a fuel flow, and a back facing an electrochemical stack;
    a permeable layer formed on the back of the filled metal substrate that is in contact with the permeable material of the filled holes;
    an anode layer proximate to the permeable layer, wherein the anode layer comprises LST ($La_{0.3}Sr_{0.7}TiO_3$) and CGO (gadolinium doped ceria);
    an electrolyte layer proximate to the anode layer;
    a diffusion barrier proximate to the anode layer; and
    a cathode proximate to the diffusion barrier.

26. The SOFC of claim 25, wherein the hydrocarbon reforming catalyst comprises Ni—Ru/CGO.

27. The SOFC of claim 25, wherein the permeable layer comprises the hydrocarbon reforming catalyst.

* * * * *